Figure 5:
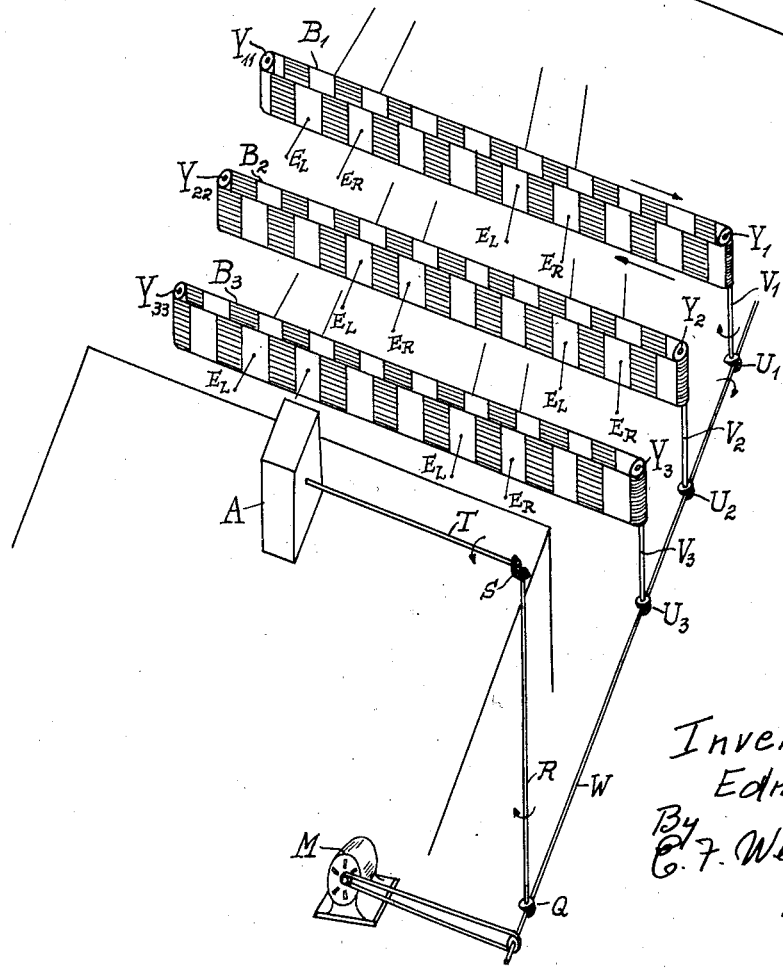

Dec. 12, 1933.  E. FEIL  1,939,343
STEREOSCOPIC PROJECTION APPARATUS
Filed Aug. 13, 1930  5 Sheets-Sheet 1
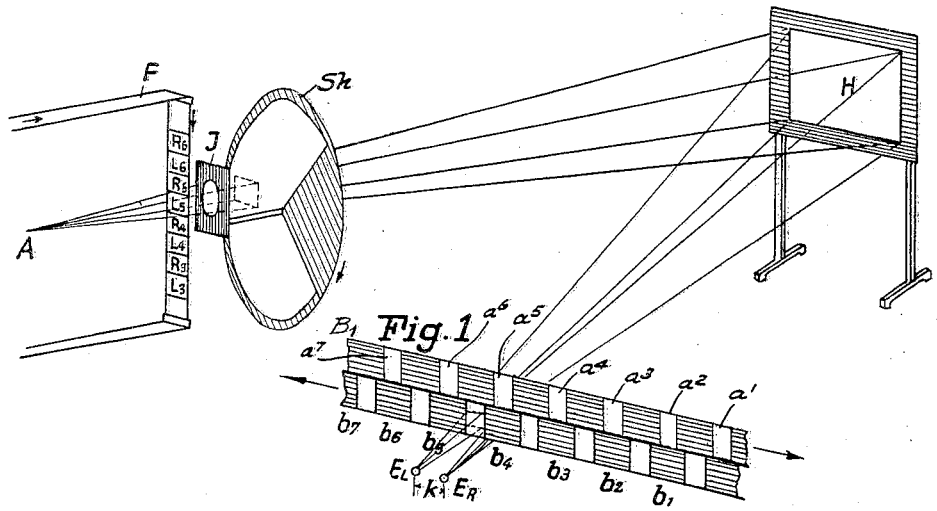
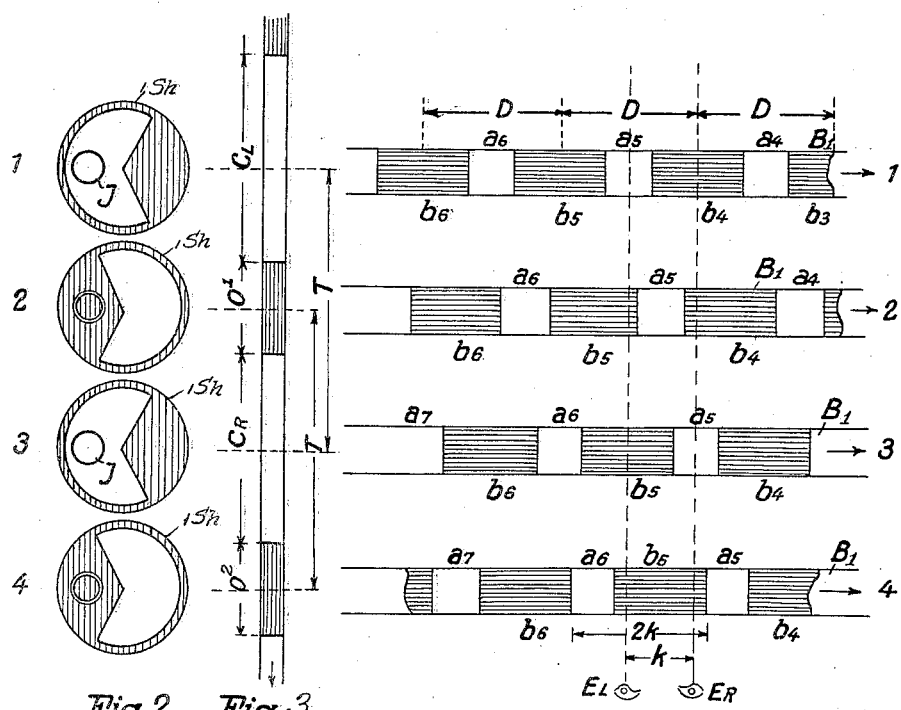
Fig.2  Fig.3  Fig.4.
Inventor:
E. Feil,
by
Langner, Parry, Card & Langner
Attys.

Dec. 12, 1933.  E. FEIL  1,939,343
STEREOSCOPIC PROJECTION APPARATUS
Filed Aug. 13, 1930  5 Sheets-Sheet 2

Inventor
Edmund Feil
By C. F. Wenderoth
Atty

Dec. 12, 1933.  E. FEIL  1,939,343

STEREOSCOPIC PROJECTION APPARATUS

Filed Aug. 13, 1930  5 Sheets-Sheet 3

Inventor
Edmund Feil
By C. F. Wenderoth
Atty.

Dec. 12, 1933.  E. FEIL  1,939,343

STEREOSCOPIC PROJECTION APPARATUS

Filed Aug. 13, 1930   5 Sheets-Sheet 4

Inventor
Edmund Feil
By C. F. Wenderoth
Atty.

Inventor
Edmund Feil
By
C. F. Wenderoth
Atty.

Patented Dec. 12, 1933

1,939,343

UNITED STATES PATENT OFFICE 1,939,343

STEREOSCOPIC PROJECTION APPARATUS

Edmund Feil, Berlin, Germany

Application August 13, 1930, Serial No. 475,029, and in Germany November 20, 1926

2 Claims. (Cl. 88—16.6)

My invention relates to an apparatus for projecting pictures in stereoscopic relief. It is an object of my invention to provide an improved apparatus for the purpose specified. To this end, in combination with a projector and with means operatively connected to the projector for alternately projecting pictures for the right and pictures for the left eye onto a screen—which pictures will be briefly referred to as "right" and "left" pictures—I provide an obstructor per row of spectators. The obstructors are endless bands with opaque portions alternating with portions which may be transparent or may be openings, for exposing the pictures on the screen to the spectators' eyes. The two reaches of every obstructor extend in parallel relation to each other and in front of the spectators in the row to which the obstructor is allotted. I further provide means which are operatively connected to the projector for operating every obstructor so that its two reaches move continuously and in opposite directions, and I so time the operation of the obstructor-moving means with respect to the operation of the projector, that the opaque portions in every reach register with each other at the moment the pictures change in the projector.

The method which is performed in my apparatus, is known as "the method of alternate picture sequence."

The known method of alternating image sequence consists in the following: Alternate left and right hand images are projected at the same point of the screen; at the moment in which a left hand picture is projected the left eye can see the screen through a transparent portion or opening in the two reaches of the obstructor and the right eye is covered by opaque portions, and vice versa.

Between the periods during which the individual right and left pictures are exposed, dark periods are interpolated during which the pictures change in the projector.

I may provide a single projector, with a film on which right and left pictures alternate, or I may provide two projectors one of which projects right, and the other projects left pictures only.

In order to obtain the proper orientation of the pictures with respect to each other, preferably all identical distance points are made to coincide.

According to my discovery, the stereoscopic relief is produced not only when each eye views the corresponding picture entirely, but also when each eye sees only a portion thereof. Assuming that the other eye sees the other portion of the picture corresponding thereto, and that at least a small portion of the picture, preferably the central portion, is seen by both eyes. Thus, for example, when the left eye sees two left thirds of the left picture and the right eye the two right thirds of the right picture the conditions for the production of perfect stereoscopic relief are fulfilled only for the central third of the picture, but the left and right thirds of the picture are also viewed stereoscopically. Furthermore, the stereoscopic effect is not destroyed when an eye completely or partially views a picture not co-ordinated therewith, assuming that it can also see the picture coordinated therewith, considerably longer than the picture not coordinated therewith. My investigations have also shown that if, for example, the left eye views the left picture three times as long as the right picture, and the right eye views the right picture three times as long as the left picture, stereoscopic relief will still be produced. With a certain limitation, particularly when the ratio of sight frequencies of the left and right pictures is 1:1 for an eye, then both eyes see double pictures, namely when the identical distance points of the left and right pictures are at a certain lateral distance apart.

My invention makes use of these discovered facts. According to my invention there is provided for each row of spectators one of the obstructors referred to. The obstructors are endless vertical bands and move continuously and at uniform velocity past the eyes of the spectators in the rows to which they are allotted, and past the backs of the spectators in the rows in front of said rows. The two reaches of every obstructor move in opposite directions but in parallel to each other, and quite a short distance apart. Their opaque portions register when the pictures change in the projector.

The obstructors are arranged at such a level above the floor of the theatre that the line of vision of the spectators intersects both reaches, that is, the spectators view the pictures on the screen only through the obstructors. In order to prevent interference, the obstructors for the individual rows of spectators are so arranged that the spectators in the rear rows look over the upper edges of the obstructors in all the rows in front of them. Under certain conditions the obstructors may have a transparent strip along their upper edges for the spectators in the rear rows to look through. A corresponding arrangement of the obstructors is practicable in almost all existing theatres, particularly if the screen is positioned high enough and the rear rows are elevated. Under less favorable conditions, the vision of a given spectator is restricted by the heads of the spectators who are in front of him.

The obstructors may be made of any suitable material, such as celluloid in which the opaque portions are made by blackening, or of some opaque material such as steel or hard rubber, with openings for looking at the pictures. By this arrangement it is made possible that the spectators are not limited to a certain position during the exhibition but that during this exhibition they may within certain limits move the head and the body to the right or left, to the front or rear (parallel movement) without losing the stereoscopic effect. In order not to exert any influence on the stereoscopic effect or relief, it is only necessary to properly select the width and the spacing of the cut-away portions and shutters.

It has already been proposed in stereoscopic projection machines to combine a film having pictures taken with two distinct cameras, that is, right and left pictures, with an endless ribbon having alternately obstructed and unobstructed perforations. The old ribbon is also endless but only one of its reaches is utilized. By utilizing both reaches, which move in opposite directions in conformity with my invention, I reduce the size of the interference zone where co-ordinated and non-coordinated pictures appear together, to a very substantial extent, as compared with a plain ribbon or obstructor, or only one reach thereof if the ribbon is endless, and I may even cause the zone to disappear altogether.

In the accompanying drawings, I have illustrated an apparatus embodying my invention, by way of example, and various diagrams illustrating its operation.

In the drawings

Figure 6:
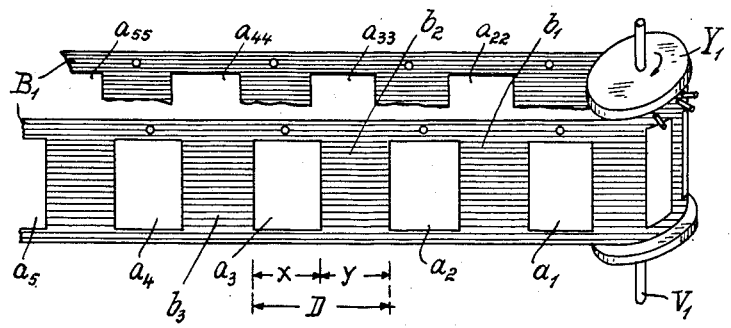
Figure 7:
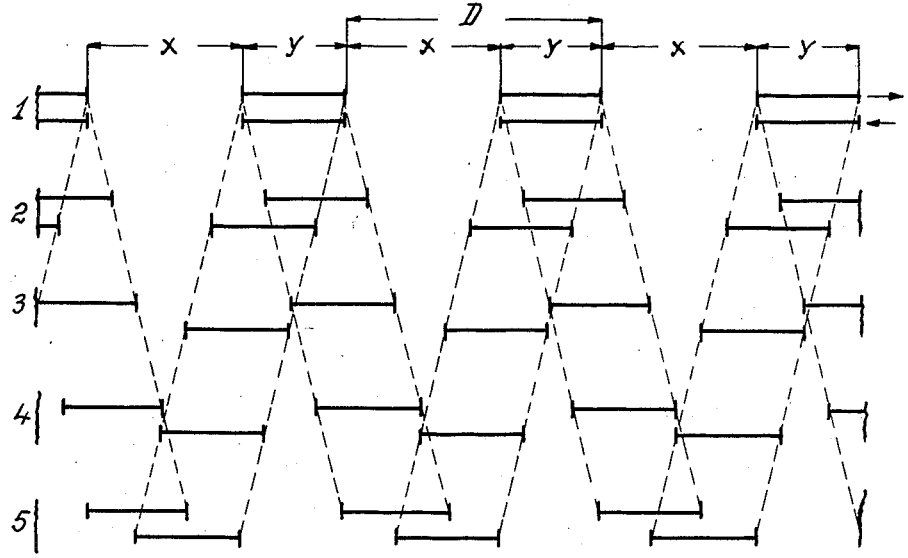
Figures 8, 9:
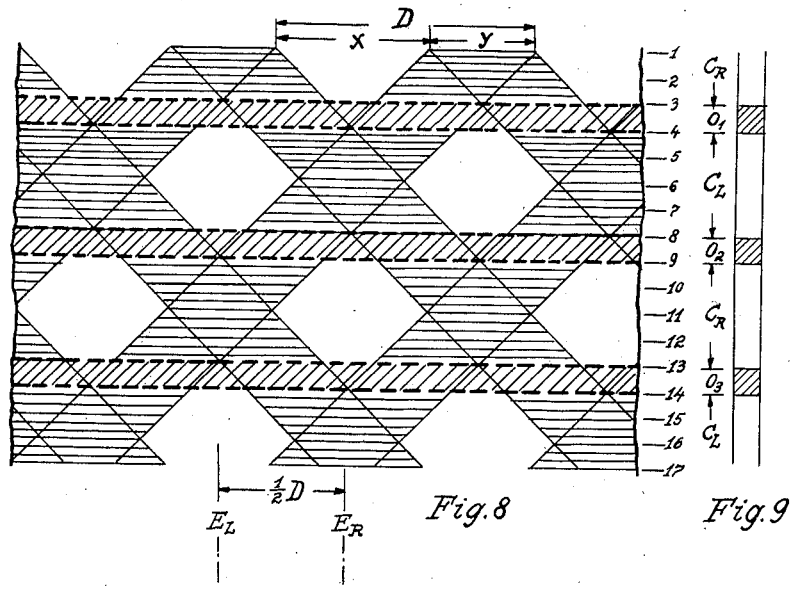
Figure 10:
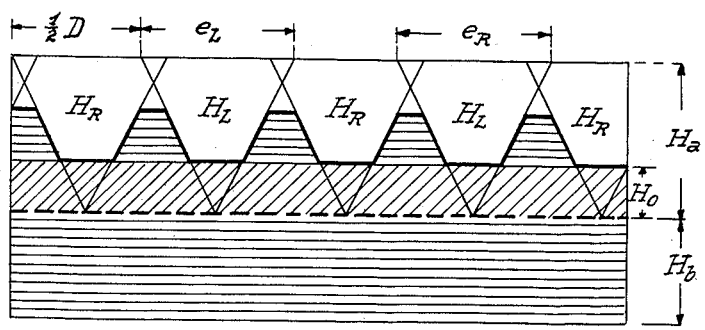
Figure 11:
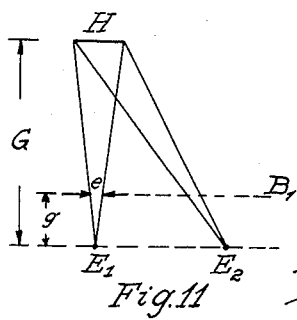
Figures 12, 13:
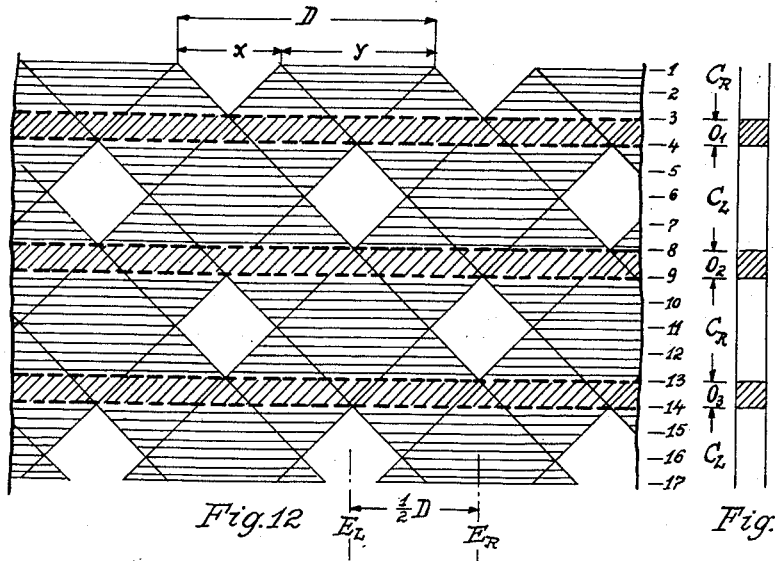
Figure 14:
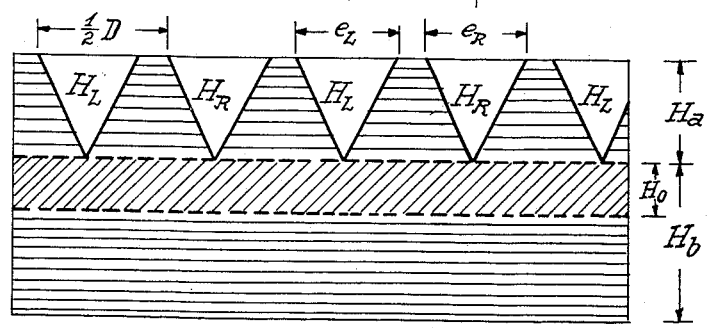
Figure 15:
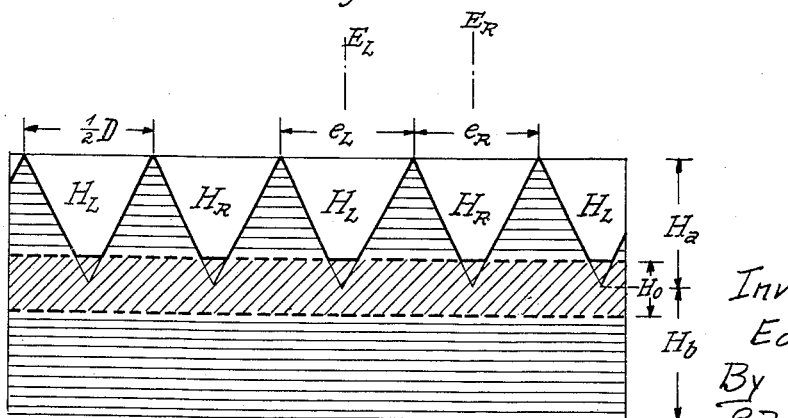

Fig. 1 is a perspective illustration showing the projector of the apparatus, a screen, and a portion of an endless obstructor, Fig. 2 shows four positions of the shutter in the projector, Fig. 3 is a diagram showing the duration of the light and dark periods; and Fig. 4 shows the positions of one obstructor reach which correspond to the shutter positions in Fig. 2, the other reach having been omitted;

Fig. 5 is a perspective illustration of an apparatus for three rows of spectators, Fig. 6 is a perspective illustration showing a portion of an obstructor for the first row of spectators, in which obstructor the width of the transparent and dark portions is the same, Fig. 7 is a diagram showing five phases of the movement for an endless obstructor, Fig. 8 is a diagram showing 17 phases of the movement of an obstructor in which the widths of the transparent portions and the opaque portions are at the ratio of 6 by 4, Fig. 9 is a diagram of the light and dark periods for the 17 phases, Fig. 10 illustrates a more lucid way of illustrating what Fig. 8 shows, Fig. 11 is a diagram showing in plan the position of two spectators with respect to their obstructor and to the screen, Figs. 12, 13 and 14 show diagrams which correspond to the diagrams in Figs. 8, 9 and 10 but are for a width ratio of 4 by 6, instead of 6 by 4, and Fig. 15 is a diagram which corresponds to Fig. 14 but is for the width ratio 5 by 5.

On Fig. 1 A designates the projector which is not shown in detail, F the film on which the left pictures $L_3$ to $L_6$ alternate with the right pictures $R_3$ to $R_6$. J designates the picture frame of the projector, $Sh$ is the rotating shutter of the projector and H the projection screen on which the pictures appear. $B_1$ is a portion of one of the obstructors whose two reaches have transparent portions or windows $a_1$ to $a_7$ and opaque portions $b_1$ to $b_7$.

With still pictures the left ones $L_3$ to $L_6$ are identical or are replaced by a single picture which is projected alternately and repeatedly with a right picture on the wall.

In the obstructor illustrated in Fig. 6, the pitch of the transparent portions, openings or windows $a_1$ etc. and the opaque portions $b_1$ etc., i. e., the width $x$ of a portion $a$ plus the width $y$ of a portion $b$, is D, and this is obviously also the distance from the centre of a transparent portion such as $a_1$ to the centre of the next portion $a_2$, or, if the width $x$ and $y$ are equal, as in the obstructor illustrated, the distance from the centre of an opaque portion such as $b_1$ to the centre of the next portion $b_2$.

In the obstructor illustrated in Fig. 6, consequently, the pitch D is equal to $x$ plus $y$, and $x$ is equal to $y$. The transparent portions or windows alternate regularly with the opaque portions throughout the length of the obstructor. The upper portion of the obstructor may be transparent, as and for the purpose specified.

If the pitch of the optical axes of the human eyes $E_r$ and $E_l$ is equal to $k$, as shown in Figs. 1 and 4, then D should be equal to $2k$, but D may exceed $2k$ for about 30%. In grown-up persons, $k$ is about 2½ in., so that D may be about 5 to 6½ in. The width $x$ of a window or transparent portion $a$ is normally about one half of D but may be 30% more or less. The width $y$ of an opaque portion is then D minus $x$.

In Figs. 2 and 3, the duration of two of the dark periods wherein the image is changed is designated by $O_I$ and $O_{II}$. The light or illuminating period for the left picture is designated by $C_L$ and that for the right picture by $C_R$. The time of changing from one picture to another is T.

Referring now to Fig. 4, only one of the reaches of an obstructor has been shown. As is easily apparent, the time in which a point of the obstructor advances for a length of D must be equal to twice the time T.

Referring now to Fig. 5, I have shown three obstructors $B_1$, $B_2$, and $B_3$ for as many rows of spectators who are indicated by their eyes E. The obstructors which, as mentioned above, should be arranged at a suitable level above the floor and so as not to interfere, and may have transparent upper edges, are operated in synchronism with the projector A. The apparatus is driven by a motor M through belting or the like, and W is the main driving shaft. This shaft, through bevel gearing Q, a vertical shaft R and a horizontal shaft T, with bevel gearing S, drives the projector A, or two projectors (not shown), if provided. The shaft W, through bevel gearing $U_1$, $U_2$ and $U_3$, drives three vertical shafts $V_1$, $V_2$ and $V_3$, each with a sprocket $Y_1$, $Y_2$ and $Y_3$, respectively, at its upper end. The obstructors B . . . are mounted on the driving sprockets of the shafts V . . . at one end, and on idle sprockets $Y_{11}$, $Y_{22}$ and $Y_{33}$ at the other end, of the row of spectators to which they are allotted. By these means, the two reaches of every obstructor are moved past the eyes of the spectators at equal velocity but in opposite directions, and their velocity is determined so that the time taken by the obstructor for moving through the distance ½ D, is exactly equal to the time which elapses between two picture changes. The limit for stereoscopic vision is 10 right and 10 left pictures per second, corresponding to 20 picture changes per second. If ½ D or $k$ is equal to 2½ in., the velocity of the obstructor is 50 in. per second.

The operation of the obstructors and the projector must be timed so that the centre of a transparent portion or window in one reach registers with the centre of a transparent portion or window in the other reach exactly after half the period between two picture changes has elapsed, and that the opaque portions register exactly when the picture change occurs. In other words, the centres of two transparent portions meet after half the period for which a given picture is visible on the screen H, has elapsed, and the centres of the opaque portions meet at the picture change.

The obstructors have the property that they do not restrict the spectators to a given position and in this respect compare favorably with some apparatus of old type, as will be more fully explained below. The spectators may move their heads and/or bodies sideways and forwards or backwards, without missing the stereoscopic effect of the pictures.

Referring now to Fig. 7, this shows diagrammatically a portion of the two reaches of an obstructor, the opaque portions $b$ being indicated by heavy black lines. The advancing movement of the opaque portions is shown by the dotted lines.

Figs. 8, 9 and 10 are diagrams for an obstructor whose width ratio is $x:y=6:4$. Fig. 8 is still more diagrammatic than Fig. 7, the dotted lines in Fig. 7 being replaced by full lines. The spaces between two adjacent lines are shaded horizontally and this is where the opaque portions $b \ldots$ are during the individual phases, 17 of which have been illustrated. The phases 1 and 11, 2 and 12, etc., are identical, so that a complete cycle includes ten phases. As in Fig. 3, O are the dark periods in Fig. 9 during which the pictures are changed. $C_L$ and $C_R$ are the illuminating periods, as described. The dark periods are indicated by the hatched areas in Fig. 8. The horizontally shaded areas are representations of the periods during which the opaque portions $b \ldots$ of the obstructor exclude the light from the spectators' eyes, and the hatched areas represent the periods during which the shutter $Sh$ cuts off the light from the screen H. The free areas indicate the periods during which the screen is exposed through the transparent portions or windows $a \ldots$.

Referring to Fig. 10, this corresponds to Fig. 8 but is more easily understood, as the shaded, hatched and free areas are more readily surveyed.

The centres of the transparent portions or windows $a$ in one reach of the obstructors meet with those of the other reach at points which are ½ D apart, as shown in phase 6 of Fig. 8. The position of these points is invariable and independent of the velocity of the obstructor. The centres of the opaque portions $b \ldots$ meet at the same points but are distorted for half a cycle. At the points, the maximum amount of light is admitted. This occurs in four out of the ten phases of a cycle. The spectator sees immovable nodes of light at the points.

Nodes admitting only left pictures alternate regularly with nodes admitting only right pictures. Centrally between two light nodes there are fixed dark nodes. The nodes are so plainly visible, particularly in darkened rooms, that the spectators involuntarily use the light nodes for looking through. If a spectator places his left eye $E_L$ in line with a light node, as shown in Fig. 8, so that the optical axis of the left eye goes through the node, the axis of the right eye automatically goes through a right node at $E_R$, as the pitch ½ D of the light nodes is about equal to the pitch $k$ of the human eyes. With his right eye, the spectator sees only right pictures, and with his left eye, he sees only left pictures, that is, he sees a stereoscopic effect. This the "normal" position of the spectators' eyes.

Even if the seats are narrow, and even if the vision is limited by the heads of spectators in the front row, or rows, every spectator has not less than 12 to 15 in. available as his field of vision, and, as the distance from one pair of light nodes to the other is about 5 in., every spectator has two complete pairs of light nodes at his disposal.

The change from the light to the dark nodes is gradual. Vision is still possible in the zone of change, but is not so good, as results from the frequency of vision for the right eye, $H_R$ in Fig. 10, and the frequency for the left eye, $H_L$ in Fig. 10. If the width $x$ of the transparent portions is greater than the width $y$ of the opaque portions, as in Fig. 8, some vision is still possible at the centre of the dark nodes. If, conversely, the width $y$ is greater, as in Fig. 12, the core of the dark nodes is altogether without vision. A limiting case is $y=x$, as shown in Figs. 6 and 15.

Referring now to Figs. 10, 14 and 15, $Ha$ is the frequency at which the transparent portions of the obstructors lay open the vision to the screen H, and $Hb$ is the frequency of vision interruption by the opaque portions in the light nodes. The ratio of the frequencies $Ha$ and $Hb$ is equal to the ratio $x:y$. However, a portion $Ho$ of $Ha$ is lost by the picture change. Outside the light-node centres, the frequency $Ha$ of vision decreases, and the frequency of interruption increases.

If a spectator holds his eyes quite near to the obstructor and moves his head along the obstructor from the "normal" position, that is, if he moves his head to the right or to the left, he gradually enters the zone of non-coordinated pictures and finally he sees only non-coordinated pictures.

$e_R$ and $e_L$ are the maximum widths for the respective eyes for which coordinated pictures go through the nodes at all, and the said widths are greater in the case of Fig. 8 than in the case of Fig. 15, and in the case of Fig. 15 they are greater than in the case of Fig. 12. On the other hand, the width for which exclusively or principally coordinated pictures are admitted, is a maximum and equal to ½ D in the case of Fig. 15. In the cases of Figs. 12 and 15, coordinated and non-coordinated pictures are not seen at the same time. In the case of Fig. 12, the core of the dark node is between the zones of coordinated and non-coordinated pictures.

Figs. 10, 14 and 15 show that the frequencies $H_L$ and $H_R$ are most favorable and the overall intensity is a maximum if $x$ is greater than $y$.

The conditions which occur if a spectator leans back, will now be explained with reference to Fig. 11. Here, the eyes $E_1$ and $E_2$ of two spectators are not close to the obstructor $B_1$ but at a distance therefrom which is $g$ and may be 15 in. if the seats are pitched 20 in. apart. G is the distance of the eyes from the screen, and $e$ is the length of the obstructor between the bordering lines of vision. The limiting case in which only coordinated pictures are viewed throughout the width of the screen H, is defined by the equation $$\frac{H}{G}=\frac{e}{g}$$

which holds good for all spectators in a row, provided that the row extends in parallel relation to the screen H. If $e=2\frac{1}{2}$ in., and $g=20$ in., $$\frac{H}{G}=\frac{2\frac{1}{2}}{20}=\frac{1}{8}.$$

In order that the said condition be fulfilled, the row must be at a distance G from the screen H which is not less than eight times the width of the projected pictures. For medium and rear rows, this condition will be fulfilled in normal cinematograph theatres. For those rows in which it is not fulfilled, $g$ may be reduced, or the spectator will not see the pictures stereoscopically throughout their width. This, however, is not a serious drawback, within certain limits, as will presently be explained.

If the spectator not only leans back but also moves to the right or the left from the "normal" position, he will notice non-coordinated pictures—if any—first at the right and left edges of the screen, and such pictures will appear at the centre of the screen only if he moves his head still further in a given direction. If his attention is directed toward the central portions of the screen, he will not even notice that he does not hold his head properly. If he observes the marginal portions of the screen, he is cautioned by observing an interference there, and will move his head to normal position quite involuntarily. It may be, however, that he does not even become conscious of the interference as a portion of the picture is strictly stereoscopic and so the spectator, under the influence of this stereoscopic impression, does not lose the relief impression even for the zone of interference. He will notice the interference the more distinctly, the further he moves his head to one side, and the further the interference encroaches from the edges toward the central region of the pictures, and will involuntarily correct it by moving his head.

If the spectator leans back, his body is held by the seat and so he can move his head only slightly to one side or the other, as movements of only 1¼ in. are very uncomfortable and will be avoided. The most unfavorable case is that $e$ in Fig. 11 is equal to $e_R$ or $e_L$, Figs. 10, 14 and 15. This can occur only if the row is very near to the screen, as explained above. Lateral displacement for 1¼ in. from the "normal" position, i. e., for ½$e_R$ and ½$e_L$ from the "normal" position, causes the zone of interference to encroach as far as the centre of the picture from its sides. If the displacement is less, or the row is further to the rear, the interference zone is smaller.

If a spectator, notwithstanding his feeling that he ought not to move his head too much to one side, does so, for instance by inclining his head and supporting it on an elbow and on the elbow rest of the seat, he moves from the zone of interference into a zone in which he sees right pictures with the left eye, and vice versa. This is the zone of pseudo-stereoscopic effect in which remote objects appear to be near, and near ones remote. However, as the size of the objects corrects the pseudo-stereoscopic effect, it will normally occur only if the person does not know the object, for instance if it is a geometric figure, or if it is up in the air. Apart from such rare exceptional cases, the stereoscopic effect occurs even in the pseudo-stereoscopic zone, for reasons which have not yet been fully investigated. It is only weakened to a certain extent, as will become apparent when viewing exchanged pictures in a stereoscope.

It follows that spectators may hold their heads as they like, if they do not mind certain interferences. A spectator who is trained to stereoscopic seeing, assumes the "normal" position. If he moves out of it, this will interfere with the stereoscopic effect the less, the further he is from the screen, and the firmer he leans to his seat.

If D is made somewhat larger than $2k$, $e_R$ and $e_L$ are extended in both directions. The "normal" position then is that in which the optical axes of the eyes are symmetrical to $e_R$ and $e_L$. In this case, the interference zone which occurs upon lateral displacement, moves further away at the sides of the screen, while interferences occur first in the central portion. D may now be so selected that interferences occur at the same time at the centre and at the sides of the screen. As mentioned, D may be made larger up to 30%, according to local conditions, and this expedient may be applied particularly to seats which are near to the screen. If D is greater than $2k$, the change from the zones of non-interference to the zones of interference is more gradual than if D is equal to $2k$.

I claim:

1. In an apparatus for projecting pictures in stereoscopic relief, a projector, a screen, means operatively connected to said projector for alternately projecting right and left pictures onto said screen from said projector, an obstructor per row of spectators, every obstructor being an endless band with opaque portions alternating with portions exposing the pictures on said screen to the spectators' eyes, the two reaches of said endless obstructor extending in parallel relation to each other and in front of the row of spectators to which the obstructor is allotted, and means operatively connected to said projector for operating every obstructor so that its reaches move in opposite directions, the operation of said obstructor-moving means being so timed with respect to the operation of said projector that the opaque portions in every reach register with each other at the moment the pictures change in said projector.

2. In an apparatus for projecting pictures in stereoscopic relief, a projector, a screen, means operatively connected to said projector for alternately projecting right and left pictures onto said screen from said projector, an obstructor per row of spectators, every obstructor being an endless band with opaque portions alternating with portions exposing the pictures on said screen to the spectators' eyes, the two reaches of said endless obstructor extending in parallel relation to each other and in front of the row of spectators to which the obstructor is allotted and means operatively connected to said projector for operating every obstructor so that its reaches move continuously and in opposite directions, the operation of said obstructor-moving means being so timed with respect to the operation of said projector that the opaque portions in every reach register with each other at the moment the pictures change in said projector.

EDMUND FEIL.